United States Patent
Santra et al.

(10) Patent No.: US 12,152,191 B1
(45) Date of Patent: Nov. 26, 2024

(54) METHODS AND COMPOSITIONS OF LOW SPECIFIC GRAVITY EUTECTIC COMPOSITE PARTICLES

(71) Applicant: SAUDI ARABIAN OIL COMPANY, Dhahran (SA)

(72) Inventors: Ashok Santra, The Woodlands, TX (US); Christelle Y. Mbuncha, Houston, TX (US); Arthur Herman Hale, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/488,694

(22) Filed: Oct. 17, 2023

(51) Int. Cl.
| | |
|---|---|
| *C09K 8/467* | (2006.01) |
| *C04B 14/34* | (2006.01) |
| *C04B 18/02* | (2006.01) |
| *C04B 28/02* | (2006.01) |
| *C04B 103/00* | (2006.01) |
| *E21B 33/138* | (2006.01) |

(52) U.S. Cl.
CPC .............. *C09K 8/467* (2013.01); *C04B 14/34* (2013.01); *C04B 18/022* (2013.01); *C04B 28/02* (2013.01); *E21B 33/138* (2013.01); *C04B 2103/0071* (2013.01)

(58) Field of Classification Search
CPC ....... C09K 8/467; C04B 14/34; C04B 18/022; C04B 28/02; C04B 2103/0071; E21B 33/138
See application file for complete search history.

(56) References Cited

U.S. PATENT DOCUMENTS

| | | | | |
|---|---|---|---|---|
| 5,188,791 A | * | 2/1993 | Thiery | C04B 28/08 |
| | | | | 106/38.2 |
| 5,236,500 A | * | 8/1993 | Schneider | C04B 24/16 |
| | | | | 106/668 |

OTHER PUBLICATIONS

Gemma Leone, Marco Consumi, Simone Pepi, Alessio Pardini, Claudia Bonechi, Gabriella Tamasi, Alessandro Donati, Claudio Rossi, Agnese Magnani, Poly-vinyl alcohol (PVA) crosslinked by trisodium trimetaphosphate (STMP) and sodium hexametaphosphate (SHMP): Effect of molecular weight, pH and phosphorylating agent on length of spacing arms, crosslinking density and water interaction, Journal of Molecular Structure, vol. 1202, 2020, 127264.

* cited by examiner

*Primary Examiner* — Crystal J Lee
(74) *Attorney, Agent, or Firm* — Vorys, Sater, Seymour and Pease LLP

(57) ABSTRACT

A eutectic composite may be utilized in oil and gas servicing. For example, a method of making such a composite may include: crosslinking a mixture including a polymer, a metaphosphate salt, and a plurality of eutectic alloy particles to yield a eutectic composite; and producing a plurality of eutectic composite particles from the eutectic composite. Furthermore, an example composition may include: a cement; water; and a plurality of eutectic composite particles including eutectic alloy particles dispersed in a polymer crosslinked with a metaphosphate salt.

6 Claims, 2 Drawing Sheets

METHODS AND COMPOSITIONS OF LOW SPECIFIC GRAVITY EUTECTIC COMPOSITE PARTICLES

FIELD OF THE DISCLOSURE

The present disclosure relates generally to reducing the specific gravity of eutectic alloy particles, and more specifically, to preparing eutectic composite particles.

BACKGROUND OF THE DISCLOSURE

The use of eutectic alloy particles in oil and gas servicing fluids, such as drilling, cementing, and spacer fluids, has been suggested to cure losses in permeable subterranean formations and casing-to-casing microannuli. When the fluid containing the eutectic alloy particles is placed in the zone of interest, an external heat source is used to melt the eutectic alloy particles into a liquid that is subsequently cooled to a temperature below the melting point of the eutectic alloy to obtain a consolidated mass, providing an ultra-low permeability sealing. However, due to the high specific gravity of the eutectic alloy particles, the particles can be difficult to suspend in the servicing fluids, creating difficulties in pumping the fluids containing the eutectic alloy particles.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A first nonlimiting method of the present disclosure includes: crosslinking a mixture comprising a polymer, a metaphosphate salt, and a plurality of eutectic alloy particles to yield a eutectic composite; and producing a plurality of eutectic composite particles from the eutectic composite.

A nonlimiting composition of the present disclosure includes: a cement; water; and a plurality of eutectic composite particles comprising eutectic alloy particles dispersed in a polymer crosslinked with a metaphosphate salt.

A second nonlimiting method of the present disclosure includes: introducing a cement slurry into a wellbore penetrating a subterranean formation, wherein the cement slurry comprises a cement, water, and a plurality of eutectic composite particles that comprise eutectic alloy particles dispersed in a polymer crosslinked with a metaphosphate salt; and allowing the cement slurry to set to a concrete in a downhole zone of interest.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
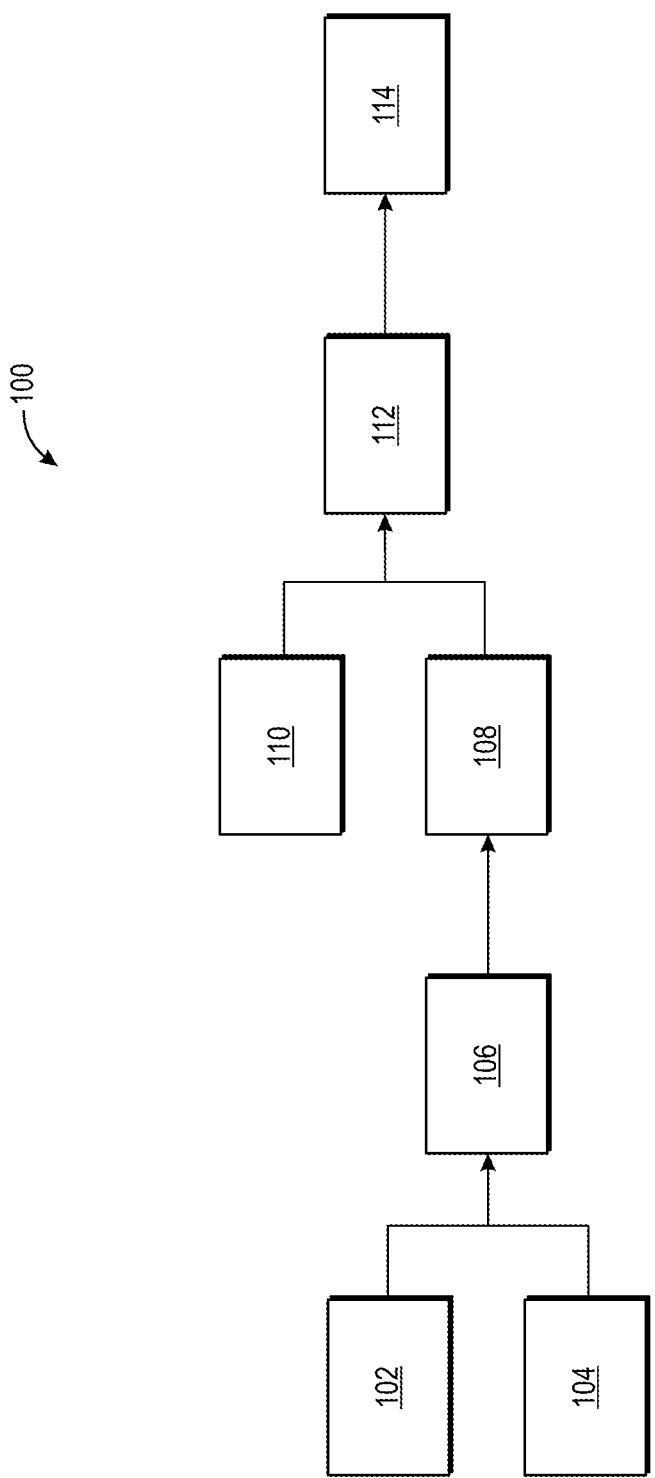
FIG. 1 illustrates a method of preparing eutectic composite particles.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to reducing the specific gravity of eutectic alloy particles, and more specifically, to preparing eutectic composite particles. The eutectic composite particles described herein may have a lower specific gravity than a pure eutectic alloy, allowing the eutectic composite particles to be easily suspended in servicing fluids, such as cementing, drilling, and spacer fluids. Moreover, the low specific gravity of the eutectic composite particles may allow the service fluids containing the eutectic composite particles to be pumped into the zone of interest with a lower risk of the particles settling in the fluid.

Methods and compositions of low specific gravity eutectic composite particles are described herein. The described methods of preparing the low specific gravity eutectic composite particles may comprise crosslinking a polymer with a metaphosphate salt in the presence of eutectic alloy particles to form a eutectic composite. The eutectic composite may be dried and a plurality of eutectic composite particles may be produced from the eutectic composite.

FIG. 1 illustrates a non-limiting example of a method 100 of preparing eutectic composite particles. A polymer 102 and a metaphosphate salt 104 are mixed in water. The resultant mixture 106 is pH adjusted to alkaline conditions. The resultant alkaline mixture 108 is mixed with a eutectic alloy 110 and heated to cause the polymer 102 mixed with metaphosphate salt 104 to crosslink, thereby forming a eutectic composite 112. The eutectic composite 112 is dried and milled (or other suitable treatment) to produce a plurality of eutectic composite particles 114.

The polymer used in the production of the eutectic composite may be in the form of solid (e.g., a powder or pellets of polymer) or a polymer solution (or slurry) comprising water. The concentration of the polymer in the polymer solution may, for example, be about 0.1 wt % to about 20 wt % (or about 0.1 wt % to about 1 wt %, or about 0.1 wt % to about 10 wt %, or about 1 wt % to about 10 wt %, or about 1 wt % to about 20 wt %) based on the total weight of the polymer solution. The polymer may include, but is not limited to, polyvinyl alcohol, the like, and any combination thereof.

The metaphosphate salt used to crosslink the polymer may be in the form of a solid (e.g., a powder) or pre-dispersed in a metaphosphate salt solution (or slurry) comprising water. The concentration of the metaphosphate salt in the metaphosphate salt solution may, for example, be about 0.1 wt % to about 20 wt % (or about 0.1 wt % to about 1 wt %, or about 0.1 wt % to about 15 wt %, or about 1 wt % to about 10 wt %, or about 10 wt % to about 20 wt %) based on the total weight of the metaphosphate salt solution. The metaphosphate salt may include, but is not limited to, sodium hexametaphosphate, sodium trimetaphosphate, the like, and any combination thereof.

The weight ratio of the polymer to the metaphosphate salt in the mixture may, for example, be about 20:1 to about 1:20 (or about 20:1 to about 10:1, or about 10:1 to about 1:10, or about 1:10 to about 1:20).

The alkaline mixture comprising the polymer, the metaphosphate salt, and the water may have a pH of about 8 to about 11 (or about 8 to about 10, or about 8.5 to about 10.5, or about 9 to about 10, or about 9.5 to about 10.5, or about 9 to about 11, or about 10 to about 11). pH adjustment may be achieved through the addition of a basic solution, such as a sodium hydroxide solution.

Eutectic alloys suitable for use in the methods and compositions of the present disclosure include, but are not limited to, bismuth-tin alloys, bismuth-lead alloys, bismuth-tin-lead alloys, the like, and any combination thereof.

The melting temperature of the eutectic alloy particles may, for example, be about 250° F. to about 300° F. (or about 250° F. to about 270° F., or about 260° F. to about 280° F., or about 270° F. to about 290° F., or about 280° F. to about 300° F.).

Any of the mixtures before crosslinking (e.g., the mixture 106 and/or the alkaline mixture 108 of FIG. 1) may be at a reduced temperature, at room temperature, or at an elevated temperature, where elevated temperatures may improve dispersion (or dissolution). Said temperature may be about 50° F. to about 100° F. (or about 50° F. to about 70° F., or about 60° F. to about 80° F., or about 70° F. to about 90° F., or about 80° F. to about 100° F.). The temperature should not be high enough to cause crosslinking.

Crosslinking the polymer with the metaphosphate salt to form the eutectic composite may, for example, be at a temperature of about 160° F. to about 190° F. (or about 160° F. to about 170° F., or about 160° F. to about 180° F., or about 170° F. to about 180° F., or about 170° F. to about 190° F., or about 180° F. to about 190° F.). Crosslinking the polymer with the metaphosphate salt to form the eutectic composite may, for example, be for a period of time of about 1 hr to about 24 hr (or about 1 hr to about 5 hr, or about 3 hr to about 10 hr, or about 8 hr to about 14 hr, or about 10 hr to about 20 hr, or about 14 hr to about 20 hr, or about 14 hr to about 24 hr).

The volume ratio of the crosslinked polymer to the eutectic alloy particles in the eutectic composite may, for example, be about 3:7 to about 9:1 (or about 3:7 to about 1:1, or about 2:3 to about 3:2, or about 1:1 to about 7:3, or about 3:2 to about 4:1, or about 7:3 to about 9:1). Without being bound by theory, different volume ratios of the crosslinked polymer used to the eutectic alloy particles may result in eutectic composites of different specific gravities.

Drying of the eutectic composite may be achieved using techniques including, but not limited to, decanting, centrifugation, heat-drying, freeze-drying, the like, and any combination thereof. Drying may, for example, occur for about 10 hr to about 24 hr (or about 10 hr to about 14 hr, or about 10 hr to about 20 hr, or about 14 hr to about 20 hr, or about 14 hr to about 24 hr). The eutectic composite may have a remaining liquid concentration of about 0.1 wt % to about 10 wt % (or about 0.1 wt % to about 1 wt %, 0.1 wt % to about 5 wt %, or about 1 wt % to about 5 wt %, or about 1 wt % to about 10 wt %, or about 5 wt % to about 10 wt %) by the total weight of the eutectic composite and the remaining liquid.

The eutectic composite may be divided into eutectic composite particles by any suitable technique, which may include, but is not limited to, autogenous milling, ball milling, buhrstone milling, high-pressure grinding, pebble milling, rod milling, semi-autogenous grinding, tower milling, vertical shaft impactor milling, the like, and any combination thereof.

The eutectic composite particles comprise eutectic alloy particles dispersed in a polymer crosslinked with a metaphosphate salt. A eutectic composite particle may comprise one or more eutectic alloy particles.

The eutectic composite particles (e.g., eutectic composite particles 114 of FIG. 1) may, for example, have an weight average diameter of about 100 μm to about 1000 μm (or about 100 μm to about 500 μm, or about 250 μm to about 750 μm, or about 500 μm to about 1000 μm).

The eutectic composite particles (e.g., eutectic composite particles 114 of FIG. 1) may, for example, have a specific gravity of about 1 g/cm$^3$ to about 4 g/cm$^3$ (or about 1 g/cm$^3$ to about 2 g/cm$^3$, or about 1 g/cm$^3$ to about 3 g/cm$^3$, or about 2 g/cm$^3$ to about 3 g/cm$^3$, or about 2 g/cm$^3$ to about 4 g/cm$^3$).

The eutectic composite particles described herein may be used in oil and gas servicing fluids, such as cementing fluids. For example, a cement slurry may comprise a cement, water, and a plurality of eutectic composite particles. Said cement slurry may further comprise additives including, but not limited to, fluid loss additives, retarders, the like, and any combination thereof.

The cement slurry may, for example, comprise about 0.5 weight percent by weight of cement (% bwoc) to about 100% bwoc of the plurality of eutectic composite particles (or about 0.5 wt % to about 20% bwoc, or about 10% bwoc to about 30% bwoc, or about 20% bwoc to about 40% bwoc, or about 30% bwoc to about 50% bwoc, or about 40% bwoc to about 60% bwoc, or about 50% bwoc to about 70% bwoc, or about 60% bwoc to about 80% bwoc, or about 70% bwoc to about 90% bwoc, or about 80% bwoc to about 100% bwoc).

The cement slurry may, for example, comprise about 40% bwoc to about 200% bwoc of water (or about 40% bwoc to about 80% bwoc, or about 60% bwoc to about 100% bwoc, or about 80% bwoc to about 120% bwoc, or about 100% bwoc to about 140% bwoc, or about 120% bwoc to about 160% bwoc, or about 140% bwoc to about 180% bwoc, or about 160% bwoc to about 200% bwoc).

The cement slurry may, for example, comprise about 0.1% bwoc to about 5% bwoc of a fluid loss additive (or about 0.1% bwoc to about 1% bwoc, or about 0.1% bwoc to about 1% bwoc, or about 1% bwoc to about 3% bwoc, or about 2% bwoc to about 4% bwoc, or about 3% bwoc to about 5% bwoc). Suitable examples of fluid loss additives include, but are not limited to, bentonite, polymer resins, modified natural polymers, cellulosics, vinylinic-based polymers, the like, and any combination thereof.

The cement slurry may, for example, comprise about 0.05% bwoc to about 5% bwoc of a retarder (or about 0.05% bwoc to about 1% bwoc, or about 0.1% bwoc to about 1% bwoc, or about 1% bwoc to about 3% bwoc, or about 2% bwoc to about 4% bwoc, or about 3% bwoc to about 5% bwoc). Suitable examples of retarders include, but are not limited to, lignosulphonates, hydroxycarboxylic acids and salts, phosphonates, sugars, borates, lead salts, zinc salts, copper salts, arsenic salts, antimony salts, the like, and any combination thereof.

The set concrete produced from a cement slurry described herein may have a specific gravity of about 1.5 g/cm³ to about 5 g/cm³. (or about 1.5 g/cm³ to about 3.5 g/cm³, or about 3 g/cm³ to about 5 g/cm³).

Methods of cementing may comprise applying the cement slurry to a downhole zone of interest. The downhole zone of interest may, for example, be a subterranean formation, an annulus between a wellbore wall and a tubular (e.g., a casing) therein, an annulus between two tubulars (e.g., between two casings), a microannulus, or a combination thereof. It should be noted that after cementing, the concrete may be, at least partially, heated so as to cause the eutectic composite particles to fill one or more defects (e.g., cracks, the like) in the concrete. Any suitable method of heating may be used including, but not limited to, for example, electrical resistance heating, induction heating, hydrocarbon heating, the like, or any combination thereof.

Figure 2:
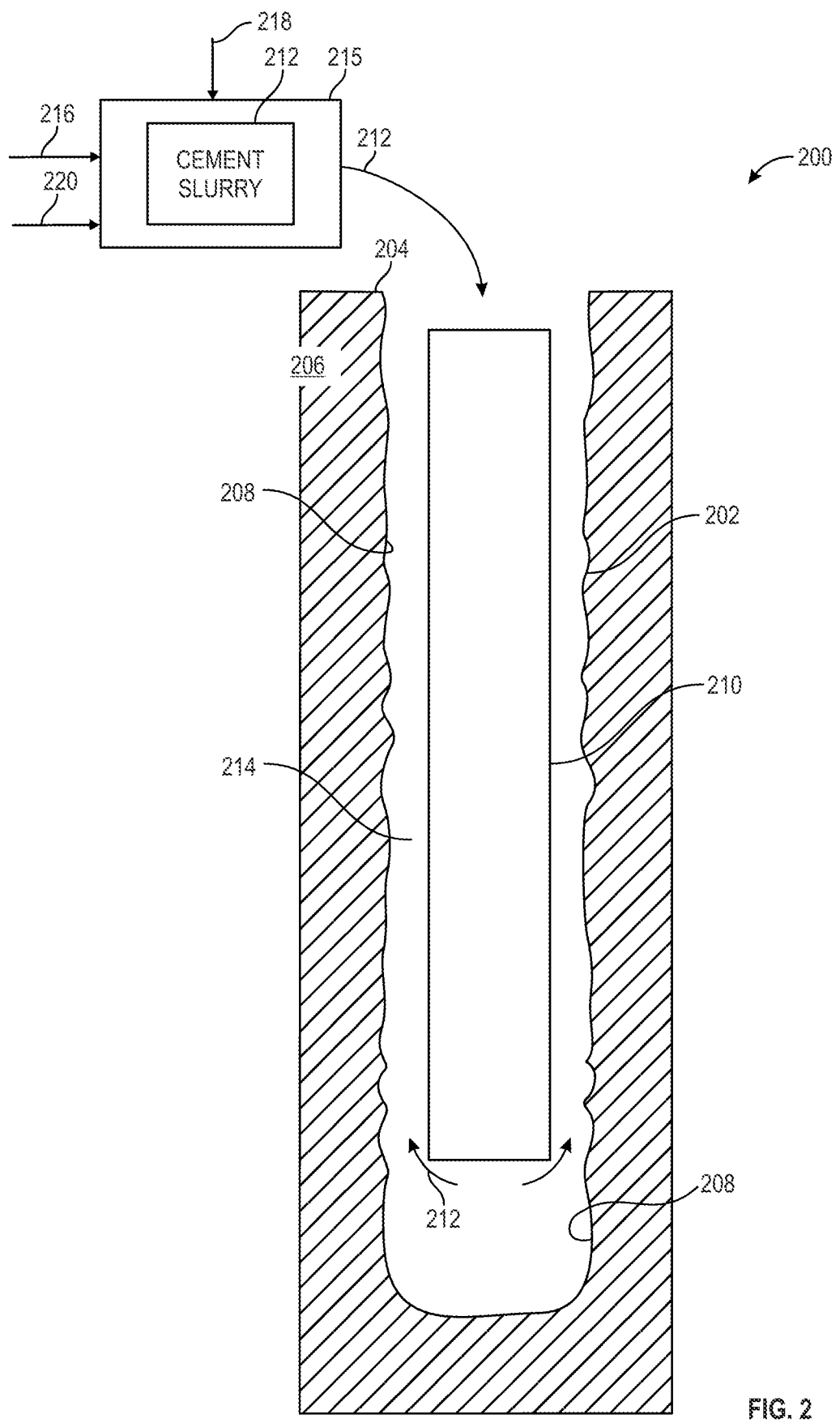
FIG. 2 illustrates a method of cementing.

FIG. 2 illustrates a non-limiting example of a cementing method 200 of the present disclosure. FIG. 2 is a well site 200 including a wellbore 202 formed through the Earth surface 204 into a geological formation 206 in the Earth crust. The wellbore 202 is defined by a borehole surface 208 of the formation 206. The wellbore 202 includes a casing 210. In some implementations to cement the casing 210 in place, a cement slurry 212 is pumped down through the casing 210. The cement slurry 212 exits the bottom portion of the casing 210 and then flows upward through the annulus 214 between the casing 210 and the formation 206. The cement slurry 212 is allowed to set in the annulus 214 to cement the casing 210. This cementing of the casing 210 may be labeled as primary cementing. The cement slurries described herein that include the eutectic composite particles described herein may also be utilized in secondary or remedial cementing operations.

Surface equipment 215 may be associated with the wellbore 202 for drilling the wellbore 202 and installation of the casing 210, and for cementing the annulus 214 between the casing 210 and the borehole surface 208. The surface equipment 215 may include a vessel or truck for holding cement slurry 212. The cement slurry 212 may be prepared at the well site 200 or off-site. The cement slurry 212 may be prepared by mixing cement 216, water 218, and cement additive(s) 220. In some implementations, the cement additives 220 may be incorporated into the cement 216 prior to the mixing with the water 218. The cement additives 220 may include polyrotaxanes or sliding-ring polymers synthesized from polyrotoxanes.

The surface equipment 215 may include a mounted drilling rig, which may be a machine that creates boreholes in the Earth subsurface. The term "rig" may refer to equipment employed to penetrate the Earth surface 204 of Earth crust. To form a hole in the ground, a drill string having a drill bit may be lowered into the hole being drilled. In operation, the drill bit may rotate to break the rock formations to form the hole as a borehole or wellbore 202. In the rotation, the drill bit may interface with the ground or formation 206 to grind, cut, scrape, shear, crush, or fracture rock to drill the hole. The open-hole wellbore having a wall 208 with the formation 206 is drilled and formed through the Earth surface 204 into the hydrocarbon or geological formation 206.

In operation, a drilling fluid (also known as drilling mud) is circulated down the drill string (not shown) to the bottom of the openhole wellbore 202. The drilling fluid may then flow upward toward the surface through an annulus formed between the drill string and the wall 208 of the wellbore 202 as openhole. The drilling fluid may cool the drill bit, apply hydrostatic pressure upon the formation penetrated by the wellbore, and carry formation cuttings to the surface. In addition to the drilling rig, surface equipment 215 may include tanks, separators, pits, pumps, and piping for circulating drilling fluid (mud) through the wellbore.

The casing 210 may be lowered into the wellbore 202 and cement slurry applied to the annulus between the casing 210 and the formation surface 208 of the wellbore 202. Oil-well cementing may include mixing a slurry of cement and water, and pumping the slurry down the casing 210, tubing, or drill pipe to a specified elevation or volume in the well. As indicated, primary cementing may involve casing cementation. Primary cementing may be the cementing that takes place soon after the lowering of the casing 210 into the formation 206 and may involve filling the annulus 214 between the casing 210 and the formation 206 with cement.

EXAMPLES

Eutectic composite particles were prepared using the methods described in the present application. A mixture of 12 mL of polyvinyl alcohol (PVA; 10 wt % in water) and 0.5 g of sodium trimetaphosphate (STMP; 15 wt % in water) was stirred for 5 minutes at room temperature. The mixture was adjusted to a pH of 10 using 0.4 mL of 30 wt % NaOH and stirred for an additional 5 minutes at room temperature. Eutectic alloy (BiSn) was added to the first mixture in varying amounts and mixed for 16 hours at 176° F. The remaining liquid was decanted from the second mixture and was dried for an additional 16 hours at 220° F. to obtain a solid eutectic composite. Following drying, the composite was ground into a fine powder to obtain a plurality of eutectic composite particles. Table 1 shows the resultant specific gravity of the eutectic composite particles given different volume ratios of PVA to BiSn.

TABLE 1

| Volume Ratio PVA:BiSn | Specific Gravity of Composite [g/cm³] |
|---|---|
| 3:7 | 3.17 |
| 4:6 | 2.62 |
| 5:5 | 2.24 |
| 6:4 | 1.95 |
| 7:3 | 1.73 |
| 8:2 | 1.55 |
| 9:1 | 1.41 |

Eutectic composite particles having a specific gravity of 2.40 g/cm³ and commercial BiSn particles having a specific gravity of 8.4 g/cm³ were used to prepare individual compositions comprising cement, water, a fluid loss additive, and a retarder. Table 2 shows the size distribution of the commercial particles.

TABLE 2

| Size [μm] | Percentage |
|---|---|
| <45 | 12.4 |
| 45 | 13.9 |
| 75 | 30.4 |
| 150 | 30.4 |
| 250 | 12.9 |

Following the API RP 10B procedure, the concentrations of the components, by weight of the cement, were 28.6% eutectic composite particles or BiSn particles, 44% water, 1% fluid loss additive, and 0.25% retarder. The compositions were allowed to cure in a cylindrical curing mold in a 180°

F. water bath for 72 hours. The cured compositions were cut into three equal cylindrical sections to observe the specific gravity gradient from the top to bottom of the cured compositions (i.e., the highest circular surface to the lowest circular surface). The difference in specific gravity from the top and bottom sections of the cured composition comprising the eutectic composite particles was less than 0.05 g/cm$^3$, while the difference in specific gravity for the cured composition comprising the denser commercial BiSn particles was greater than 0.05 g/cm$^3$. The lower difference in specific gravity of the cured composition comprising the eutectic composite particles indicates a more homogenous distribution of the eutectic composite particles in the composition than the composition comprising the BiSn particles.

Additional Embodiments

Embodiments disclosed herein include:

Embodiment 1. A method comprising: crosslinking a mixture comprising a polymer, a metaphosphate salt, and a plurality of eutectic alloy particles to yield a eutectic composite; and producing a plurality of eutectic composite particles from the eutectic composite.

Embodiment 2. The method of Embodiment 1, wherein the metaphosphate salt comprises sodium hexametaphosphate, sodium trimetaphosphate, or a combination of sodium hexametaphosphate and sodium trimetaphosphate.

Embodiment 3. The method of Embodiment 1 or 2, wherein the polymer comprises polyvinyl alcohol.

Embodiment 4. The method of any one of Embodiments 1-3, wherein the mixture has a pH of about 8 to about 11.

Embodiment 5. The method of any one of Embodiments 1-4, wherein the eutectic alloy particles comprises a bismuth-tin alloy, a bismuth-lead alloy, a bismuth-tin-lead alloy, or any combination thereof.

Embodiment 6. The method of any one of Embodiments 1-5, wherein the volume ratio of the crosslinked polymer to the eutectic alloy is about 3:7 to about 9:1.

Embodiment 7. The method of any one of Embodiments 1-6, wherein the crosslinking occurs at a temperature of about 160° F. to about 190° F.

Embodiment 8. The method of any one of Embodiments 1-7, wherein the plurality of eutectic composite particles have a specific gravity of about 1 g/cm$^3$ to about 4 g/cm$^3$.

Embodiment 9. A composition comprising: a cement; water; and a plurality of eutectic composite particles comprising eutectic alloy particles dispersed in a polymer crosslinked with a metaphosphate salt.

Embodiment 10. The composition Embodiment 9, wherein the metaphosphate salt comprises sodium hexametaphosphate, sodium trimetaphosphate, or a combination of sodium hexametaphosphate and sodium trimetaphosphate.

Embodiment 11. The composition of Embodiment 9 or 10, wherein the polymer comprises polyvinyl alcohol.

Embodiment 12. The composition of any one of Embodiments 9-11, wherein the eutectic alloy particles comprises a bismuth-tin alloy, a bismuth-lead alloy, a bismuth-tin-lead alloy, or any combination thereof.

Embodiment 13. The composition of any one of Embodiments 9-12, wherein the volume ratio of the polymer crosslinked with the metaphosphate salt to the eutectic alloy is about 3:7 to about 9:1.

Embodiment 14. The composition of any one of Embodiments 9-13, wherein the plurality of eutectic composite particles have a specific gravity of about 1 g/cm$^3$ to about 4 g/cm$^3$.

Embodiment 15. The composition of any one of Embodiments 9-14, further comprising a fluid loss additive, a retarder, or any combination thereof.

Embodiment 16. The composition of any one of Embodiments 9-15, wherein the composition is a solid.

Embodiment 17. A method comprising: introducing a cement slurry into a wellbore penetrating a subterranean formation, wherein the cement slurry comprises a cement, water, and a plurality of eutectic composite particles that comprise eutectic alloy particles dispersed in a polymer crosslinked with a metaphosphate salt; and allowing the cement slurry to set to a concrete in a downhole zone of interest.

Embodiment 18. The method of Embodiment 17, wherein the downhole zone of interest is an annulus between a wellbore wall and a tubular therein, an annulus between two tubulars, a microannulus, or a combination thereof.

Embodiment 19. The method of Embodiment 17 or 18, wherein the metaphosphate salt comprises sodium hexametaphosphate, sodium trimetaphosphate, or a combination of sodium hexametaphosphate and sodium trimetaphosphate.

Embodiment 20. The method of any one of Embodiments 17-19, wherein the polymer comprises polyvinyl alcohol.

Embodiment 21. The method of any one of Embodiments 17-20, wherein the eutectic alloy comprises a bismuth-tin alloy, a bismuth-lead alloy, a bismuth-tin-lead alloy, or any combination thereof.

Embodiment 22. The method of any one of Embodiments 17-21, wherein the volume ratio of the polymer crosslinked with the metaphosphate salt to the eutectic alloy is about 3:7 to about 9:1.

Embodiment 23. The method of any one of Embodiments 17-22, wherein the plurality of eutectic composite particles have a specific gravity of about 1 g/cm$^3$ to about 4 g/cm$^3$.

Embodiment 24. The method of any one of Embodiments 17-23, wherein the cement slurry further comprises a fluid loss additive, a retarder, or any combination thereof.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing." "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method comprising:
    introducing a cement slurry into a wellbore penetrating a subterranean formation, wherein the cement slurry comprises a cement, water, and a plurality of eutectic composite particles that comprise eutectic alloy particles dispersed in a polymer crosslinked with a metaphosphate salt; and
    allowing the cement slurry to set to a concrete in a downhole zone of interest.

2. The method of claim 1, wherein the downhole zone of interest is an annulus between a wellbore wall and a tubular therein, an annulus between two tubulars, a microannulus, or a combination thereof.

3. The method of claim 1, wherein the metaphosphate salt comprises sodium hexametaphosphate, sodium trimetaphosphate, or a combination of sodium hexametaphosphate and sodium trimetaphosphate.

4. The method of claim 1, wherein the eutectic alloy comprises a bismuth-tin alloy, a bismuth-lead alloy, a bismuth-tin-lead alloy, or any combination thereof.

5. The method of claim 1, wherein the volume ratio of the polymer crosslinked with the metaphosphate salt to the eutectic alloy is about 3:7 to about 9:1.

6. The method of claim 1, wherein the plurality of eutectic composite particles have a specific gravity of about 1 $g/cm^3$ to about 4 $g/cm^3$.

* * * * *